No. 892,373. PATENTED JUNE 30, 1908.
T. F. HATTON.
HEATING STOVE.
APPLICATION FILED MAY 22, 1907.
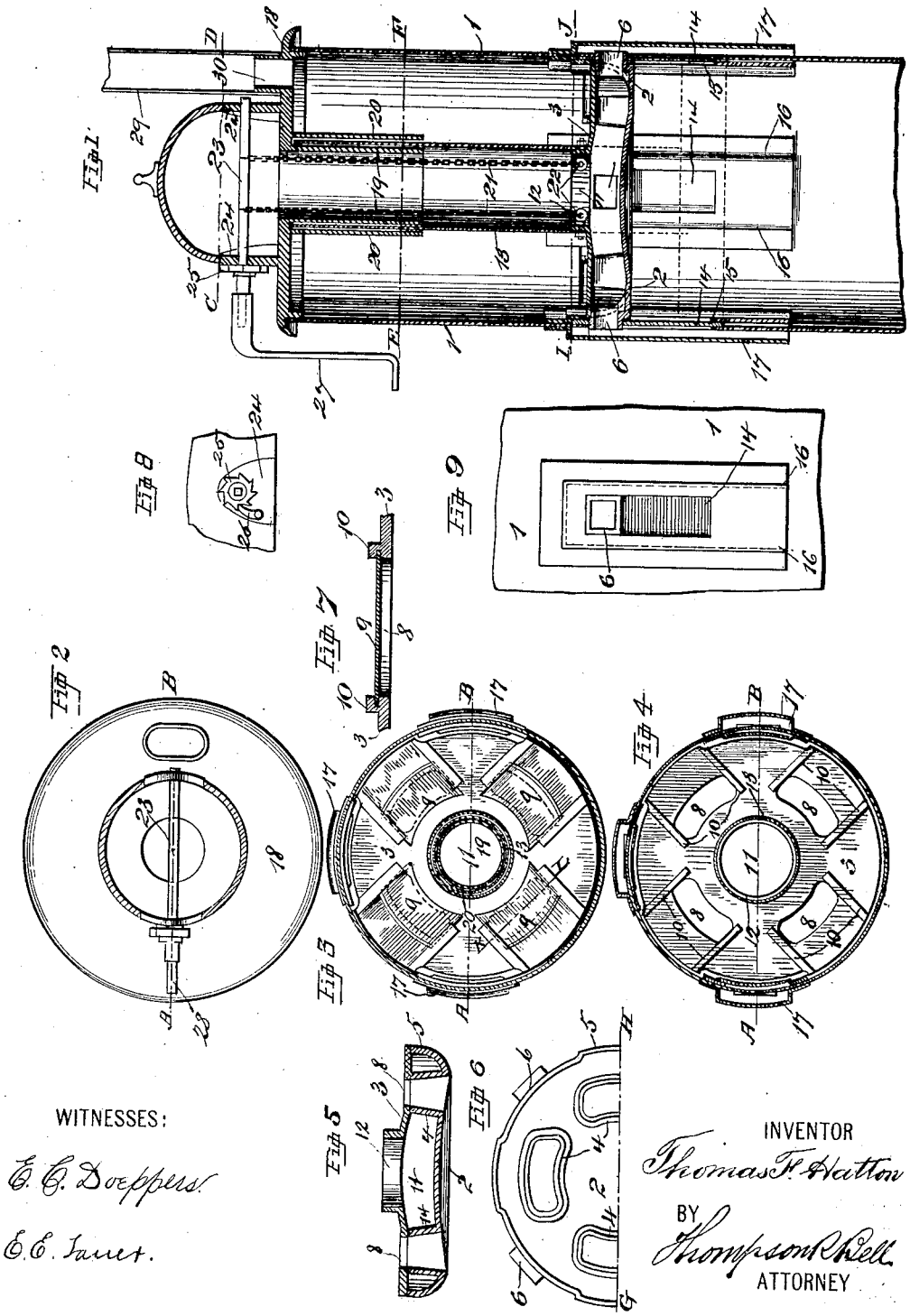
WITNESSES:
INVENTOR
BY
ATTORNEY
THE NORRIS PETERS CO., WASHINGTON, D. C.

UNITED STATES PATENT OFFICE.

THOMAS F. HATTON, OF INDIANAPOLIS, INDIANA.

HEATING-STOVE.

No. 892,373.　　　　Specification of Letters Patent.　　　Patented June 30, 1908.

Application filed May 22, 1907. Serial No. 375,120.

*To all whom it may concern:*

Be it known that I, THOMAS F. HATTON, citizen of the United States, residing at Indianapolis, in the county of Marion and State of Indiana, have invented certain new and useful Improvements in Heating-Stoves, of which the following is a specification, reference being had therein to the accompanying drawing.

This invention relates to certain improvements in heating-stoves, and is an improvement of my invention patented July 10th 1906, No. 825,533, and consists of the additional improvements hereinafter described and particularly pointed out in the claims.

The object of this invention is to provide an air heating chamber which may be applied to the ordinary or any heating stove whereby the said air heating chamber will rest upon the top of the fire and whereby the same will automatically descend as the fire in the stove burns lower to maintain said air heating chamber in close contact with the top of the fire, and to provide means whereby the fire may be choked to that degree to cause it to burn slowly or to smolder. I attain these objects by means of the heating stove illustrated in the accompanying drawings in which like numerals of reference designate like parts throughout the several views.

Figure 1 is a broken-off sectional elevational view of the top portion of a heating stove showing my invention of an air heating and circulating means applied thereto and taken along the line A. B. in Figs. 2, 3, and 4; Fig. 2 is a top sectional view of the stove taken along the line C—D in Fig. 1; Fig. 3 is a transverse sectional view taken along the line E—F in Fig. 1; Fig. 4 is a view similar to that of Fig. 3, taken along the line I—J, in Fig. 1, and showing the damper doors of the hot air chamber removed; Fig. 5 is a detail sectional view of the air-heating chamber taken along the line G—H in Fig. 6; Fig. 6 is a half top view of the same showing the removable top cover thereof removed to exhibit the interior of said chamber; Fig. 7 is an enlarged broken detail view of the top cover of the air heating chamber showing the damper-door and its guides, and taken along the line K—L in Fig. 3; Fig. 8 is a broken detail sectional view of a portion of the top of the stove showing one of the winding shaft bearings and pawl and ratchet mechanism thereof, and, Fig. 9, is a detail view of one of the sliding panels, whereby the openings through which the projecting air inlet ducts of the air heating chamber project, are closed.

The stove to which this apparatus is applied may be of any suitable type of heating stove provided with a casing 1, the lower or grate portion thereof not being shown, as the same is not necessary to a proper understanding of my invention as applied to a heating stove, since any kind of a grate and base may be used in connection with the heating stove to which this invention is applied without affecting its operation.

The movable or descending hot air chamber, which is the main feature of this invention, comprises a bowl shaped under vessel portion 2, and an upper cover portion 3. The under vessel portion 2 has its bottom wall portion dished and provided with the upwardly extending vent ducts 4 which are preferably formed integral with the bottom of said vessel 2 and the peripheral wall 5 the top edges of both of which are in the same plane. The air inlet ducts 6 extend radially from the peripheral wall 5 to project through the stove casing 1, and the same are provided to supply pure air to and into the air heating chamber to be heated. The cover portion 5, which is adapted to fit upon the top edges of the peripheral wall 5 and the ducts 4, is provided with the openings 8 which are adapted to register with the openings of said ducts 4 to provide free passage ways through the air heating chamber to permit not only the discharge of the smoke from the fire therethrough but also to provide means |by which fuel may be added to the fire from time to time when such is required. The duct openings 8 of the cover 3 which register with the openings of the ducts 4, are provided with the slidable damper doors 9 which are adapted to be slid between the guides 10 formed integral on the removable cover 3 and the said slidable doors 9 are provided for the purpose of closing the openings 8 when it is required to choke the fire in the stove which is accomplished by sliding said doors to close said openings or to reduce the area of the openings thereof.

A hot air exit opening 11 is provided with a collar 12 over which the vertically extending air conduit 13 is fitted and securely bolted thereto, and said conduit is provided for the purpose of conveying the heated air from the interior of the air heating chamber as it is heated to the exterior top portion of the heating stove.

The casing 1 of the stove is provided with the vertically extending slots 14, one for each air inlet duct 6, through which said air inlet ducts 6 of said descending chamber project to the exterior of the stove to receive a constant supply of fresh air, and said slots are sufficiently long to permit the air inlet ducts 6 to descend an extent equal to the travel of the air heating chamber within the stove which latter rests upon the fuel of the fire and must descend to remain in contact with the fire as the latter burns lower.

It is obvious that means must be provided whereby the open portions of the slots not occupied by the ducts 6 be closed to prevent the gases and smoke resulting from the combustion of the fuel within the stove escaping therethrough into the room wherein the stove is placed. This I accomplish by providing the sliding panels 15 which are provided with duct receiving openings, each of which is adapted to receive and accurately fit over its air inlet duct 6, and said sliding panels are adapted to fit in and slide vertically in their guides 16 which latter are fitted and secured in any suitable manner to the interior surface of the casing 1 of the stove to maintain said sliding panel 15 in close contact with the interior surface of the casing 1. The guards 17 are situated to extend over the open ends of the air inlet ducts 6 to prevent the entrance of dirt and the said guards are secured to the casing 1 of the stove.

The top 18 of the stove is provided with the concentric tubes 19 and 20 which depend therefrom into the interior of the stove and between these depending tubes the extended top portion of the air conduit 13 is adapted to telescope. Suspension chains 21 are secured to the eye bolts 22 situated interiorly and near the bottom end of the conduit 13, and said chains 21 extend upwardly in the interior of said conduit to be secured at their other ends to the horizontally extending winding shaft 23. The winding shaft 23 is supported in the bearing standards 24 on the top of the stove top 18. A ratchet 25 and a pawl 26 whereby said winding shaft 23 may be locked to retain the movable or descending air heating chamber at any point of its travel and a suitable crank 27 adapted to be applied to the square end 28 of the said shaft whereby to turn the latter, are sufficient means whereby to control the descent of the air heating chamber.

The operation of my invention will be better understood by the following description of the operation:—The air heating chamber is first raised in the interior of the stove its full extent by means of the crank 27 whereby the winding shaft 23 is revolved to wind the suspension chains 21, to obtain sufficient space under said air heating descending chamber in which to place kindling and fuel to start the fire. The vent damper sliding doors 9 situated over the openings 8 are opened their full extent to obtain the full area of the openings of the ducts 4 through which the smoke and gases of the lighting fire pass to the stove pipe 29 secured on the collar 30 formed integral on the top of the stove. Immediately the fuel begins to burn freely in the stove the heating chamber is permitted to descend to rest upon the fire so as to be in direct contact therewith to be heated to the full extent. When it is desirable to reduce the circulation of the hot air and also the temperature of the same the hot air chamber is elevated some distance from the fire according to the degree of heat required to heat the circulating air. The damper doors 9 may be used for the purpose of regulating the degree of combustion of the fire in the stove by adjusting the area of the openings of the ducts 4 to correspond with the combustion required in the stove.

I claim:—

1. In a heating stove, the combination with the top thereof and a fixed open ended tube situated within said stove and depending from the top thereof, of a lower movable or descending chamber loosely fitted into said stove to slide vertically therein and having a top air outlet portion, a collar extending around said top air outlet portion, an air conduit extending around and secured to said collar, said conduit extending upwardly to receive said depending fixed open ended tube to slide vertically thereon, vent ducts extending vertically through said lower movable or descending chamber, means for admitting air into said lower movable or descending chamber and means for permitting said chamber to descend as the fire in the stove burns lower.

2. In a heating stove, the combination with the top thereof, and a fixed open ended tube situated within said stove and depending from the top thereof, of a lower movable or descending chamber loosely fitted into said stove to slide vertically therein and having a top air outlet portion, a collar extending around said top air outlet portion, an air conduit extending around and secured to said collar said conduit extending upwardly to receive said depending fixed open-ended tube to slide vertically thereon, vent ducts extending vertically through said lower movable or descending chamber, damper doors over said ducts, means for admitting air into said lower movable or descending chamber and means for permitting said chamber to descend as the fire in the stove burns lower.

In testimony whereof I affix my signature in presence of two witnesses.

THOMAS F. HATTON.

Witnesses:
 THOMPSON R. BELL,
 FRANCIS M. SPRINGER.